(12) United States Patent
Coudron

(10) Patent No.: US 9,580,113 B2
(45) Date of Patent: Feb. 28, 2017

(54) MOTOR VEHICLE COMPONENT THAT WITHSTANDS THERMAL DEFORMATION

(71) Applicant: Compagnie Plastic Omnium, Lyons (FR)

(72) Inventor: Philippe Coudron, Caluire et Cuire (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 14/056,157

(22) Filed: Oct. 17, 2013

(65) Prior Publication Data

US 2014/0105669 A1    Apr. 17, 2014

(30) Foreign Application Priority Data

Oct. 17, 2012  (FR) ...................................... 12 59912
May 6, 2013   (EP) ...................................... 13166647

(51) Int. Cl.
| | |
|---|---|
| B62D 27/00 | (2006.01) |
| B62D 29/00 | (2006.01) |
| B62D 25/00 | (2006.01) |
| B60J 5/04 | (2006.01) |
| B62D 27/02 | (2006.01) |
| B62D 29/04 | (2006.01) |

(52) U.S. Cl.
CPC ............ *B62D 27/00* (2013.01); *B60J 5/0481* (2013.01); *B62D 25/00* (2013.01); *B62D 27/02* (2013.01); *B62D 29/00* (2013.01); *B62D 29/04* (2013.01); *Y10T 403/217* (2015.01)

(58) Field of Classification Search
CPC ........ B62D 27/00; B62D 27/02; B62D 29/00; B62D 29/04; B62D 25/00; Y10T 403/217; B60J 5/0481
USPC ................................ 296/187.01, 203.01, 191
See application file for complete search history.

(56) References Cited

U.S. PATENT DOCUMENTS

| | | |
|---|---|---|
| 5,011,201 A | 4/1991 | Takahashi et al. |
| 6,129,378 A | 10/2000 | Goto et al. |
| 6,394,537 B1 * | 5/2002 | DeRees .......................... 296/191 |
| 6,749,254 B1 * | 6/2004 | Kleven et al. ................. 296/191 |

FOREIGN PATENT DOCUMENTS

| | | |
|---|---|---|
| DE | 10010580 | 9/2001 |
| EP | 0799758 | 10/1997 |
| EP | 0799759 | 10/1997 |
| FR | 2771992 | 6/1999 |

* cited by examiner

*Primary Examiner* — Joseph D Pape
*Assistant Examiner* — Dana Ivey
(74) *Attorney, Agent, or Firm* — Jacox, Meckstroth & Jenkins

(57) ABSTRACT

The invention relates to a motor vehicle bodywork component comprising a first panel and a second panel having a second coefficient of linear thermal expansion greater than the first coefficient of linear thermal expansion of the first panel, the component further including a connection part having a third coefficient of linear thermal expansion that is less than the first and that is fastened to the first panel.

20 Claims, 1 Drawing Sheet

MOTOR VEHICLE COMPONENT THAT WITHSTANDS THERMAL DEFORMATION

CROSS-REFERENCE TO RELATED APPLICATIONS

This application claims priority to French Application No. 1259912 filed Oct. 17, 2012, and to European Application No. 13166647.1 filed May 6, 2013, which applications are incorporated herein by reference and made a part hereof.

BACKGROUND OF THE INVENTION

1. Field of the Invention

The present invention relates to motor vehicle bodywork parts, whether they be static parts or opening members.

2. Description of the Related Art

Most bodywork parts are made of metal sheet, usually steel sheet. Bodywork parts made of plastics material are becoming more and more widespread, such as bumpers, tailgates, fenders, etc., which parts coexist at their interfaces with other parts that are still made of metal, such as fenders, hoods, doors, etc.

Such parts made of plastics material may present defects that are particularly visible in an outside panel because the panel can be seen from the outside, and defects show up in particular at the periphery of such an outside panel.

Various ways are known for accommodating differences of expansion under the effect of temperature, in particular when hot because of strong sunlight.

Thus, it is known to select the component materials of such parts depending on their coefficients of linear thermal expansion (CLTE). It is also known to make such parts, while providing them with reinforcement seeking to avoid excessive deformation. Thus, such parts are dimensioned, in particular in terms of thickness or in the form of ribs, or indeed by fitting them with reinforcement made of stronger material, so as to improve the stiffness of the parts under consideration.

It is also known to handle defects in local manner, i.e. at the edge of a part where excessive changes in clearance or departures from flush alignments are most visible.

There is only a limited choice for the plastics materials from which to make such parts. Material choice depends on a technical and economic compromise seeking to comply with various constraining clauses of specifications for the vehicle. It frequently happens under certain conditions laid down in the specification, in particular extreme levels of sunlight, that these parts deform excessively, thereby degrading appearance, and in particular degrading the perceived quality of clearances and alignments that ought to be flush. Panels that are strongly deformed can also give rise to jamming and scratching on painted parts facing such panels, particularly if they are included in a moving system.

In order to overcome those defects, designers are thus constrained to overdimension components or a set of assembled-together components so as to make them less deformable, which then makes them heavier and more expensive, which therefore goes against the initial objective for choosing to make them out of plastics material.

Thus, for tailgates, particularly those that are said to be "all plastic", the components are made up of two main parts, a box situated on the inside of the vehicle and a panel situated on the outside of the vehicle. The box and the panel are assembled together, typically by adhesive. They are also connected to the body and they are subjected to various forces via hinges, actuators, a lock, and a peripheral weather strip. Those various forces vary depending on varying situations, in particular depending on whether the tailgate is closed, open, being subjected to high temperatures, or indeed being slammed shut in particularly rough manner. The panel is often painted and is the part that is visible when the tailgate is closed, and it is therefore with the panel that the above-mentioned defects are observed the most easily, particularly in comparison with surrounding bodywork elements. Under the effect of temperature, the panel suffers both from a loss of performance, i.e. it becomes more deformable, and from expansion of the materials from which it is made.

The loss of mechanical performance leads to deformation because the tailgate, even when it is in the closed position, is subjected to forces simultaneously by the actuators for assisting opening, by the weather strip compressed against the body, and by the hinge and anchoring points relative to the vehicle such as the hinges, the lock, and the tailgate stops on the vehicle body. Deformation is particularly severe at the hinges, since they are typically made of steel and secured to the body, thereby constituting points where the tailgate is constrained. The tailgate can deform only in zones where it is not constrained, e.g. between the hinges or beyond them, i.e. at the margins of the part. This mechanical deformation is also associated with deformation due to expansion. Expansion occurs within the panel, and also within the box, and indeed in differential manner between those two components, since they may be made of different plastics materials, the box typically having a coefficient of linear thermal expansion that is smaller than that of the panel. The connections between the panel and the box, particularly when they are adhesive connections, are therefore subjected to forces that are particularly intense.

In order to validate a tailgate design, in particular in terms of high temperature performance, the specifications generally require tests to be performed that consist in imposing successive temperature variation cycles on the tailgate, or more particularly on the assembly constituted by the outer panel and the box or inner panel of the tailgate. Those cycles have an amplitude of about 80° C., but that varies between manufacturers, and the number of cycles performed lies in a range of 15 to 20 cycles, approximately. In that type of testing, the tailgate does not always have enough time to return to its initial shape prior to expansion before the next cycle begins. An effect of deformation accumulating from cycle to cycle is therefore observed with the deformation of the tailgate becoming progressively more degraded.

SUMMARY OF THE INVENTION

An object of the invention is to remedy the above-mentioned drawbacks by proposing a motor vehicle bodywork component presenting greater ability to withstand thermal deformation, while still being suitable for making at low cost and using little material.

According to the invention, this object is achieved by a motor vehicle bodywork component comprising a first panel having a first coefficient of linear thermal expansion and a second panel having a second coefficient of linear thermal expansion greater than the first coefficient of linear thermal expansion, wherein the component further comprises a connection part made of a material having a third coefficient of linear thermal expansion less than the first coefficient of linear thermal expansion, this connection part being fastened to the first panel at at least two fastening points.

Advantageously, the first panel and the second panel are placed so as to cover each other.

Advantageously, the first panel is an inside panel, whereas the second panel is an outside, appearance panel.

Advantageously, the connection part is made of a material selected from the group constituted by steel, aluminum, and composite materials.

Advantageously, the fastening points fastening the connection part to the first panel are obtained by any of the following means: spot overmolding, screw fastening, riveting, clip fastening, strapping, dogging, adhesive bonding, embedding.

Advantageously, the connection part is made of a sheet of material having thickness lying in the range 0.5 millimeters (mm) to 1.5 mm.

Advantageously, the connection part presents a longitudinal direction, and the connection part presents a profile having a slenderness ratio defined in a section perpendicular to the longitudinal direction of the connection part as the ratio of a deployed width of the sheet constituting its profile to a thickness of the sheet, which slenderness ratio lies in the range 20 to 80.

Advantageously, the slenderness ratio of the connection part is substantially equal to 50.

Advantageously, the spacing between two consecutive fastening points between the connection part and the first panel lies in the range 30 mm to 80 mm.

Advantageously, the spacing between two consecutive fastening points between the connection part and the first panel is substantially equal to 50 mm.

Advantageously, the bodywork component is constituted by movable parts capable of occupying at least two distinct positions.

Advantageously, the bodywork component constitutes an opening member.

Advantageously, the bodywork component is selected from the following list: tailgate, a downwardly-opening rear panel (also referred to as a "hatch"), a fender, a hood, a side door, a sill, a capping strip, a trim strip, a roof frame, a bumper, a spoiler, a sun roof.

BRIEF DESCRIPTION OF THE ACCOMPANYING DRAWINGS

The invention can be better understood on reading the following description given purely by way of example and made with reference to the drawing, in which.

DETAILED DESCRIPTION OF THE PREFERRED EMBODIMENTS

Figure 1:
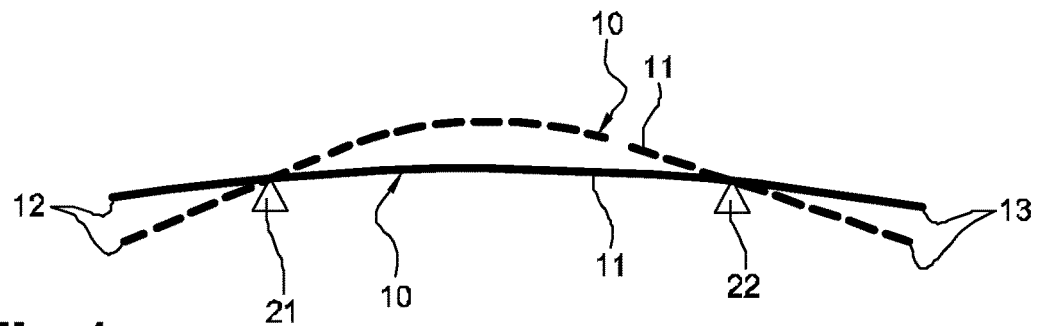
FIG. 1 is a section view of a prior art motor vehicle bodywork component when subjected to thermal expansion.

FIG. 1 is a diagrammatic view of a motor vehicle bodywork component. In this example, the component is a structure 10 represented by a continuous line in a situation in which it is not subjected to any expansion, and by a dashed line in a situation where it is exposed to intense solar radiation.

The structure 10 is fastened to the body of the vehicle by two hinges 21 and 22 represented by triangles. Since the body of the vehicle is made of a material having a smaller coefficient of expansion than the structure 10, the hinges 21 and 22 are spaced apart by a distance that is constant under both of the presently-considered situations, with or without sunshine. Thus, the structure 10 presents a central portion 11 situated between the hinges 21 and 22, which central portion 11 is subjected to stress horizontally by the hinges 21 and 22. An expansion of this central portion 11 thus gives rise to the vehicle being outwardly deformed in bending or "bulging". By continuity, the margins 12 and 13 of the structure 10 of the bodywork component move towards the inside of the vehicle under a tangential effect around the hinges 21 and 22.

Figure 2:
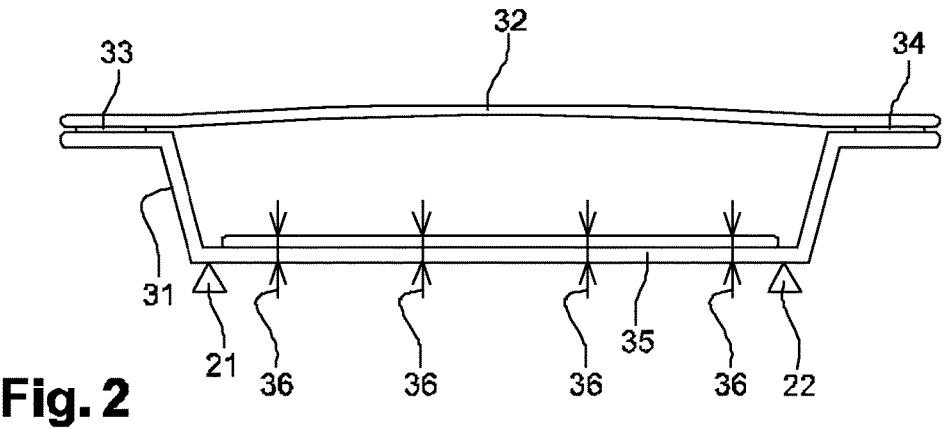
FIG. 2 is a section view on a horizontal plane of a tailgate in an embodiment of the invention, before thermal expansion.

FIG. 2 shows a motor vehicle bodywork component of the invention, specifically a tailgate. This tailgate of the invention presents a structure 30 itself fastened to two hinges 21 and 22 also represented by triangles. The structure 30 is constituted by a box 31 also referred to as the inner panel and an outer panel 32 also referred merely as a panel. In conventional manner, the box 31 and the outer panel 32 are placed so that they overlap each other. In this example they are assembled together by two peripheral zones 33 and 34 of adhesive.

The tailgate made up of such a structure 30 also presents a connection part 35 in the form of a spar 35 extending so as to cover the box 31. The spar 35 is placed against a face of the box 31 that faces towards the outer panel 32, the spar 35 thus being between the box 31 and the outer panel 32. The spar 35 is thus hidden from view, whether from the outside or from the inside of the vehicle. The spar 35 is fastened to the box 31 via a sequence of fastening points 36 that are distributed along the length of the spar 35. Thus, during expansion of the box 31 under the effect of heat, the box 31 tends to extend the spar 35 essentially in its length direction. The spar 35 is made of a material having a coefficient of linear expansion (CLTE) that is less than that of the box 31. The expansion force on the box 31 is thus transferred to the spar 35 which absorbs this force, and very little of this expansion force is transferred to the outer panel 32 or to the hinges 21 and 22. The presence of this spar 35 also makes it possible to oppose expansions of the box 31. The presently-described spar 35 is not in direct connection with the hinges 21 and 22, but in a variant it could be, thereby giving even greater stiffness to the spar 35.

Figure 3:
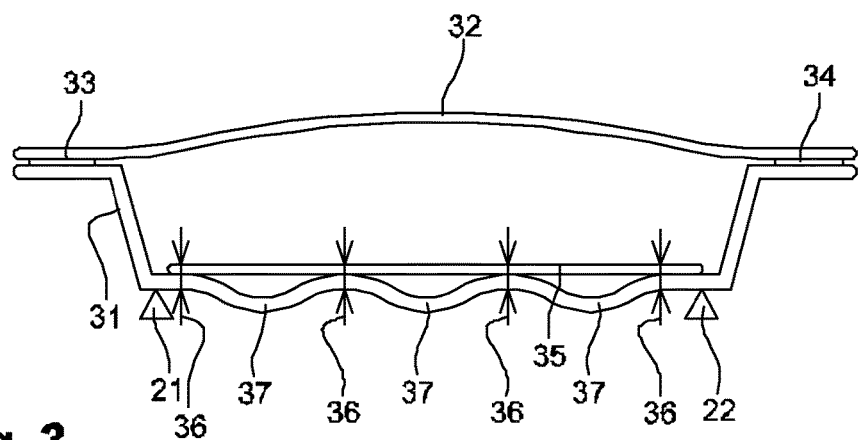
FIG. 3 is a section view on a horizontal plane of the same tailgate, after thermal expansion.

As shown in FIG. 3, as a result of the various fastening points 36 between the spar 35 and the box 31, which points are distributed along the length of the spar 35, overall expansion of the box 31 is prevented in a direction that is preferably horizontal (as has been observed by the inventors on the tailgate of the embodiment described). Such a configuration is found to be sufficient to greatly limit the overall expansion of the tailgate.

Small local bulging effects 37 do indeed appear between the successive fastening points 36, nevertheless their amplitude is greatly reduced compared with same-type tailgates, which do not include such a spar 35, and such local deformations of the box 31 are not transmitted to the outer panel 32.

The portion of the bodywork component that is given treatment against expansion deformation is thus the structural inside portion of the tailgate, which inside portion is typically referred to as a box 31 or an inside panel. Such an inside panel or box 31 is structural because its initial role is to carry the visible outer panel 32 and it typically presents a coefficient of linear thermal expansion that is less than that of the outer panel 32, which is made of plastics material. Although the portion treated by the presence of the spar 35 is the portion that is least subjected to thermal expansion because it is less exposed to solar radiation and because of its small coefficient of linear thermal expansion, it is found that the treatment of this inside portion, specifically the box 31, greatly reduces the overall deformation of the structure 30, by reducing indirectly but most effectively the visible deformation of the outer panel 32, which in this example is an appearance part, i.e. a part that is visible to the user. In addition, the spar 35 is found to play the role of a return spring on a return to the initial temperature. It thus assists the structure 30 in returning more quickly to its initial shape, which effect is particularly advantageous when performing the temperature cycling test.

Since the spar 35 prevents the box 31 as a whole expanding merely because it opposes longitudinal deformation, it eliminates bulging of the box 31 as a whole. Because it works essentially by opposing longitudinal deformation, there is no need for it to be dimensioned as though it were structural reinforcement. It operates essentially in local traction between two successive fastening points 36, and its transverse dimensions may thus be particularly small.

The fastening points between the box 31 and the spar 35 may be implemented by spot overwelding, by screw fastening, by riveting, by clip fastening, by strapping, by dogging, or by other fastening techniques. The fastening points 36 between the connection part 35 and the remainder of the structure 30 may be made for example merely by using discrete fastening points 36 such as the tops of any rib already present in the structure 30 on the box 31.

The spar 35 needs to present stiffness that is longitudinal only, and its bending stiffness may remain particularly small, so the spar 35 can thus be limited to an element of small section. It therefore presents little extra weight in comparison with the structural reinforcement commonly used for stiffening panels, and it is therefore compatible with the approach that consists in making bodywork components out of plastics material in order to lighten vehicles.

In this example, the spar 35 is made in the form of a steel sheet that is folded to present a channel section. The steel sheet presents thickness of 0.5 mm and the steel used may present a coefficient of linear thermal expansion that is equal to $1.1 \times 10^{-5}$. The spar 35 also presents a slenderness ratio, i.e. in its cross-section a ratio of the deployed width of its section to the thickness of the sheet constituting the section, that is of the order of 50. Its slenderness preferably has a value lying in the range 20 to 80 in order to achieve a good compromise between sufficient stiffness in bending and light weight. In addition, the spar 35 may present a cross-section of various shapes, such as a rectangular section, or as in the present example, a channel section. The spar 35 may also present a section of shape that is more complex.

In this embodiment, the box 31 is made of composite material, specifically polypropylene 40% filled with glass fibers (40% GFPP). In this example the box 31 presents thickness of 3.5 mm and a coefficient of linear thermal expansion of $4 \times 10^{-5}$.

The fastening points 36 between the box 31 and the spar 35 in this example are spaced apart by about 50 mm. They are preferably spaced apart by an interval lying in the range 30 mm to 80 mm, with a minimum that is preferably 30 mm.

In a variant, the spar 35 may be made of aluminum, which presents a coefficient of linear thermal expansion of $2.6 \times 10^{-5}$. The spar 35 may also be made of composite material, e.g. out of a sheet molding compound (SMC) type composite material. Such a composite material then typically has a coefficient of linear thermal expansion of $1.5 \times 10^{-5}$. The thicknesses selected for the box 31 and the spar 35 are adapted to the material used, depending on the Young's modulus of the material and on the feasibility of using it industrially. With aluminum, the thickness of the sheet constituting the spar 35 is advantageously about 0.8 mm and with SMC composite material the thickness of the sheet is advantageously about 1.5 mm.

In order to enable the spar 35 to operate in traction, a minimum of two fastening points 36 with the box 31 suffices, but it is preferable to provide a larger number. A spacing of about 50 mm between two consecutive fastening points 36 enables the box 31, and thus the bodywork component as a whole, to be stiffened in particularly effective manner. Advantageously, the spacing between two fastening points 36 lies in the range 30 mm to 80 mm, which spacing is also appropriate for a shape that is rounded or a shape that has changes of level.

Obtaining such control over deformation makes it possible to select other materials for the box 31 and for the outer panel 32. It also makes it possible to reduce the structural dimensioning that is sometimes incorporated in such elements for the purpose of opposing their deformation, such as increased thicknesses or ribs. It also makes it possible to reduce and/or eliminate the additional structural reinforcement that is sometimes placed in the outer panel 32.

The connection part in this example is in the shape of a spar 35, however in a variant it could be of some other form, with weight that is lower than in the previously proposed structural configuration so that it can serve to lighten the bodywork component as a whole.

This type of technique applies not only to a tailgate or to a tailgate zone as described herein, but applies more widely to any tailgate zone and to any other vehicle bodywork component that can be made in part or in full out of plastics materials, such as a fender, a hood, a side door, a sill, a capping strip, a trim strip, a roof frame, or indeed a bumper.

The invention is not limited to the presently described embodiments and other embodiments will appear clearly to the person skilled in the art.

While the method and system herein described constitute preferred embodiments of this invention, it is to be understood that the invention is not limited to this precise method and system, and that changes may be made therein without departing from the scope of the invention which is defined in the appended claims.

What is claimed is:

1. A motor vehicle bodywork component, comprising a first panel having a first coefficient of linear thermal expansion and a second panel having a second coefficient of linear thermal expansion greater than the first coefficient of linear thermal expansion, wherein the motor bodywork component further comprises a connection part made of a material having a third coefficient of linear thermal expansion less than the first coefficient of linear thermal expansion, said connection part being fastened to the first panel at a plurality of fastening points;

wherein said connection part facilitates preventing longitudinal deformation to eliminate bulging of said first panel; and wherein said connection part is connected at multiple points to said first panel.

2. The motor vehicle bodywork component according to claim 1, wherein the first panel and the second panel are placed in opposed relationship so that they cover each other.

3. The motor vehicle bodywork component according to claim 1, wherein the first panel is an inside panel, whereas the second panel is an outside, appearance panel.

4. The motor vehicle bodywork component according to claim 1, wherein the connection part is made of a material selected from the group constituted by steel, aluminum, and composite materials.

5. The motor vehicle bodywork component according to claim 1, wherein said plurality of fastening points fastening the connection part to the first panel are obtained by any of the following means: spot overmolding, screw fastening, riveting, clip fastening, strapping, dogging.

6. The motor vehicle bodywork component according to claim 1, wherein the connection part is made of a sheet of material having thickness lying in the range 0.5 mm to 1.5 mm.

7. The motor vehicle bodywork component according to claim 1, wherein the connection part presents a longitudinal direction, and the connection part presents a profile having a slenderness ratio defined in a section perpendicular to the longitudinal direction of the connection part as the ratio of a deployed width of a sheet constituting its profile to a thickness of said sheet, which slenderness ratio lies in the range 20 to 80.

8. The motor vehicle bodywork component according to claim 7, wherein the slenderness ratio of the connection part is substantially equal to 50.

9. The motor vehicle bodywork component according to claim 1, wherein the spacing between two consecutive fastening points between the connection part and the first panel lies in the range 30 mm to 80 mm.

10. The motor vehicle bodywork component according to claim 9, wherein the spacing between two consecutive fastening points between the connection part and the first panel is substantially equal to 50 mm.

11. The motor vehicle bodywork component according to claim 1, wherein said first panel and said second panel are movable with respect to each other and capable of occupying at least two distinct positions.

12. The motor vehicle bodywork component according to claim 11, constituting an opening member.

13. The motor vehicle bodywork component according to claim 1, selected from the following list: tailgate, a downwardly-opening rear panel (also referred to as a "hatch"), a fender, a hood, a side door, a sill, a capping strip, a trim strip, a roof frame, a bumper, a spoiler, a sun roof.

14. The motor vehicle bodywork component according to claim 2, wherein the first panel is an inside panel, whereas the second panel is an outside, appearance panel.

15. The motor vehicle bodywork component according to claim 2, wherein the connection part is made of a material selected from the group constituted by steel, aluminum, and composite materials.

16. The motor vehicle bodywork component according to claim 3, wherein the connection part is made of a material selected from the group constituted by steel, aluminum, and composite materials.

17. The motor vehicle bodywork component according to claim 2, wherein said plurality of fastening points fastening the connection part to the first panel are obtained by any of the following means: spot overmolding, screw fastening, riveting, clip fastening, strapping, dogging.

18. The motor vehicle bodywork component according to claim 3 wherein said plurality of fastening points fastening the connection part to the first panel are obtained by any of the following means: spot overmolding, screw fastening, riveting, clip fastening, strapping, dogging.

19. The motor vehicle bodywork component according to claim 4, wherein said plurality of fastening points fastening the connection part to the first panel are obtained by any of the following means: spot overmolding, screw fastening, riveting, clip fastening, strapping, dogging.

20. The motor vehicle bodywork component according to claim 2, wherein the connection part is made of a sheet of material having thickness lying in the range 0.5 mm to 1.5 mm.

* * * * *

UNITED STATES PATENT AND TRADEMARK OFFICE
CERTIFICATE OF CORRECTION

PATENT NO. : 9,580,113 B2  Page 1 of 1
APPLICATION NO. : 14/056157
DATED : February 28, 2017
INVENTOR(S) : Philippe Coudron It is certified that error appears in the above-identified patent and that said Letters Patent is hereby corrected as shown below:

In the Claims

Column 6, Line 47, insert -- vehicle -- after "motor".

Signed and Sealed this
Eighteenth Day of April, 2017

Michelle K. Lee
*Director of the United States Patent and Trademark Office*